May 5, 1931.  G. M. WRIGHT ET AL  1,804,136
SIGNAL TRANSMITTING SYSTEM
Original Filed March 5, 1926
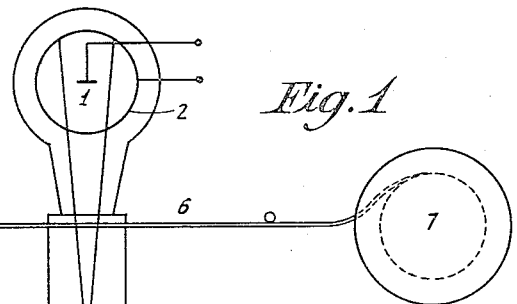
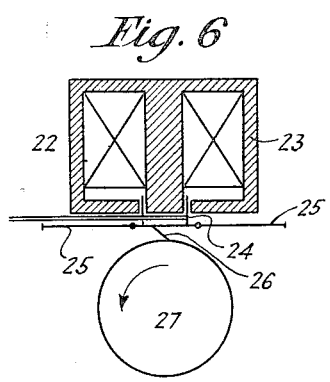
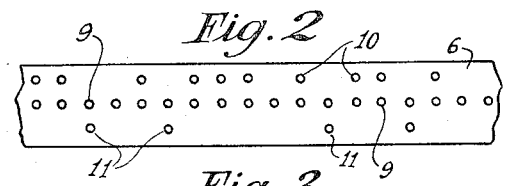
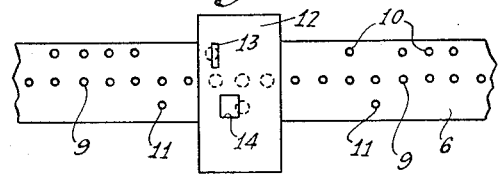
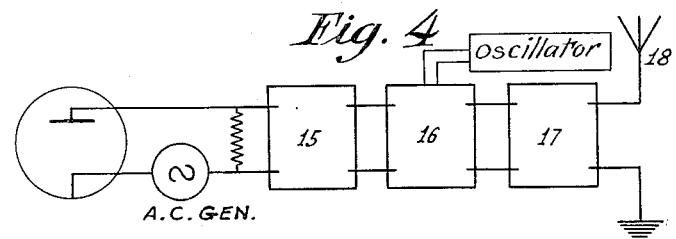
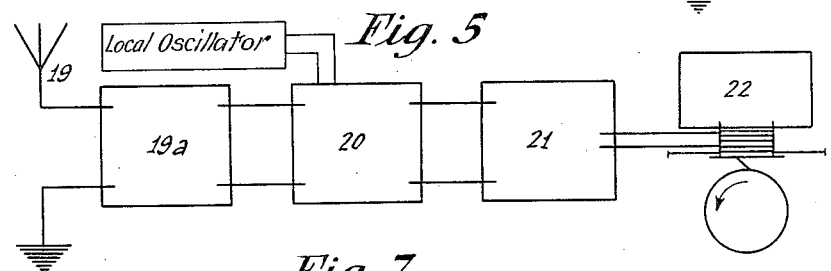
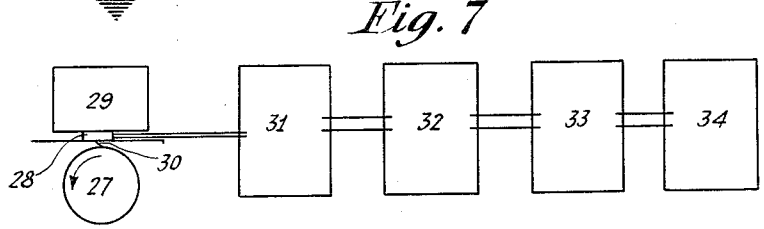
Inventor
GEORGE M. WRIGHT AND
SIDNEY B. SMITH
By their Attorney Patented May 5, 1931

1,804,136

UNITED STATES PATENT OFFICE

GEORGE MAURICE WRIGHT, OF CHESTERFIELD, AND SIDNEY BERTRAM SMITH, OF CHELMSFORD, ENGLAND, ASSIGNORS TO RADIO CORPORATION OF AMERICA, A CORPORATION OF DELAWARE

SIGNAL TRANSMITTING SYSTEM

Application filed March 5, 1926, Serial No. 92,382, and in Great Britain March 6, 1925. Renewed May 6, 1929.

Our invention relates to means for transmitting and receiving signals at high speed.

An object of our invention is to provide means for recording signals, transmitting them at ultra-high speed, re-recording them at that speed and transcribing them at a lower speed.

Another object of our invention is to provide a perforated tape and transmitting means to operate at ultra-high speed.

Another object of our invention is to provide a tape transmitting device cooperating with a light sensitive means adapted to function at ultra-high speed.

Another object of our invention is to provide in an ultra-high speed signal system, a sending apparatus and in cooperation an ultra-high speed receiving apparatus, adapted to transcribe signals at a lower speed.

Another object of our invention is to provide a signal receiving system adapted to respond to a super-audible vibration frequency.

Another object of our invention is to provide a signal receiving device adapted to record signals, directly in pulses of high or radio frequency vibrations.

Our invention further relates to improvements in transmitting apparatus of the type comprising a light sensitive cell, such as a selenium cell, through which a current is passed, an optical system for projecting a beam of light on to the cell, and a moving tape in the path of the beam, provided with perforations therethrough and adapted to shut off the beam intermittently, and means for amplifying the variations in the current flowing through the cell.

The main object of the present invention is to provide apparatus by which signals can be transmitted and/or received at a much greater speed than has hitherto been possible.

According to the present invention the perforations in the tape are arranged to cause signals of different length corresponding to dots and dashes of the Morse code, and high frequency impulses for each dot and dash are obtained either by providing means for cutting off the light at high frequency intervals or by employing a high frequency alternating current in the light sensitive cell circuit or a circuit associated therewith and controlled thereby, in which latter cases the impulses are rectified and filtered through a low pass filter before they pass to the signalling devices.

In order to record the signals, we employ apparatus similar to a phonograph having a rotating wax cylinder.

Hitherto it has been considered that the useful upper limit of frequency which can be recorded on such a cylinder is in the neighborhood of 3000 cycles.

We have found that if a recording stylus be attached directly to a moving coil or similar system situated in an intense magnetic field, then it is possible to record frequencies lying within the radio band, say, 20,000 periods per second. As a result it is possible to use a phonograph to record and reproduce signals originally sent at, say, 1,000 words per minute, for if the recording frequency be 20,000, then if we reproduce at 30 words per minute the reading note will be 600 periods per second, which is quite a good reading note.

We have also found that by utilizing a moving coil or like system in a similar manner fitted with a reproducing stylus and amplifying the resultant E. M. F's in the coil to actuate a high speed printer or undulator, it is possible by rotating the wax cylinder at a higher speed to reproduce at, say, 100 to 200 words per minute. Preferably in this case we interpose some form of band filter between the coil and printer, in order to eliminate stray effects due to record hiss.

Other objects and structural details of our invention will be apparent from the following description when read in connection with the accompanying drawings, wherein:

Fig. 1 is a diagrammatic representation of signal translating apparatus embodying a portion of our invention, Fig. 2 shows a length of tape suitable for use with our invention, Fig. 3 shows a similar length of tape in combination with a suitable shutter means, Fig. 4 is a digrammatic representation of a radio transmitter apparatus in combination with the photo-electric cell represented in Fig. 1, Fig. 5 is a diagrammatic representation of a receiver and recorder adapted to be embodied in our invention.

Fig. 6 is a view in sectional elevation of a suitable recording apparatus for embodiment in our invention and, Fig. 7 shows diagrammatically a transcribing or "reading up" apparatus.

Referring to Figure 1, 1, 2 are the target and bulb of a photo-electric cell which is screened and whose output terminals are connected to the amplifying and signaling apparatus. 5 is a source of light which is focused by means of a lens 4 upon a perforated signal tape 6, which, in conjunction with a shutter (not shown in this figure), controls the light which falls upon the photo-electric cell. The signal tape 6 is fed from a spool 7 and propelled across the beam of light by means of a star wheel 8 which engages driving holes arranged as in the usual manner along the center of the tape. The photo-electric cell may be included in a high frequency alternating current circuit, so that pulses of high frequency current will flow in the said circuit when the said cell is illuminated, or the light from the source 5 may be interrupted at high frequency, as by means of a rotating shutter interrupter or by employing an electric lamp to which is fed high frequency current; or the output from the photo-electric cell may be caused to modulate a high frequency current either before or after amplification.

Referring to Figure 2, which shows a length of signal tape, 9 are the holes whereby the said tape is propelled, while 10 and 11 are holes whereby a signal may be transmitted. Of these holes, 10 are utilized for the formation of dots, while both 10 and 11 serve to form dashes. The tape, which is preferably colored with a suitable dye, rendering it substantially opaque to light, interrupts the light from the source 5 (Figure 1), in conjunction with the mask 12. The said mask is provided with two slits 13 and 14, arranged as shown in Figure 3. The tape is propelled continuously across the mask and it will be seen that when one of the holes 10 passes beneath the slit 13, a pulse of light of length corresponding to a dot, will be allowed to fall upon the photoelectric cell (Figure 1). If, however, two holes 10 and 11 are positioned on the tape, as are the two holes shown beneath the mask in Figure 3, a pulse of light of length corresponding to a dash will be allowed to pass, because the slots 13, 14 are so spaced that light is allowed to pass through hole 11 and slot 14, before that passing through hole 10 and slot 13 is cut off.

A suitable arrangement for transmitting signals by wireless is shown in Figure 4. Referring to this figure, 15 is an amplifier, 16 a modulator, 17 a transmitter and 18 a transmitting aerial. The pulses of current in the photo-electric cell may be amplified in any known manner, after which they are passed through a modulation circuit and finally transmitted.

It is necessary that all the circuits including the photo-electric cell, amplifiers, modulators and transmission lines, possess sufficiently flat frequency attenuation curves so that all the modulation side bands are fully transmitted, otherwise badly formed and rounded signals will result. In the amplifying system some form of limiting device should be employed, so that he signal amplitude and formation will be correct for any variations in the intensity of the light source.

If there are direct current amplifiers employed in the system, it is very important that all the triodes are operated in a condition such that no grid currents flow, otherwise serious "slurring" of the signals will prevent the successful transmission at very high speeds.

Any well known system of modulating the transmitter can be employed; for example, continuous waves can be modulated at a supersonic frequency, or continuous wave direct current modulation may be employed.

By employing this system for forming and transmitting telegraph characters, it has been found possible to transmit messages from ordinary Morse tape at far higher speeds than hitherto thought possible.

Figure 5 illustrates one form of receiving system. Referring to this figure, 19 is a receiving aerial, 19a, a receiver, 20 an amplifier and amplitude limiter, 21 a filter mesh designed to pass all the modulation side bands necessary to produce sharp definition, and 22 a recording device. The amplifier and amplitude limiter 20 may, if necessary, incorporate a frequency changing device for continuous waves.

Figure 6 shows the recording device 22 (Figure 5) in more detail. Referring to this figure, 23 is an electromagnet for producing an intense field; 24 is a coil suspended in the field; 25 are flexible ligaments or other supports for the coil 24; 26 is a cutting jewel or stylus and 27 is a rotating wax phonograph cylinder. Upon rotation of this cylinder, the jewel will cut a spiral groove, as in the usual manner. The high speed signals passing through the coil 24 will cause the jewel to vibrate upon the wax cylinder, and as a result a record will be obtained of the incoming signal.

It is very important to design the recording mechanism such that no mechanical resonance points are present, as otherwise bad records will result at or near these frequencies. The wax cylinder is rotated at a constant speed, and should be kept constant by any well known means such as a tuning fork.

The completed high speed record thus obtained is transferred to a slow motion reading-up arrangement, such as that shown in Figure 7.

Referring to this figure, 27 is the wax cylinder which is rotated at a suitable constant speed; 28 is a moving coil suspended in an intense magnetic field; 29 is the magnet and 30 is a needle, reproducing jewel or the like running on the record and attached to the coil 28. It will be seen that the signals upon the wax cylinder will cause the coil 28 to vibrate, and consequently an alternating E. M. F. will result. These signals are passed through a filter 31 which is employed to "clean up" the hiss inherent in wax cylinders. The filtered signals are now amplified by an amplifier 32, converted into direct current by an amplifier and rectifier 33, and finally fed to telephones or a printer, modulator or other device 34.

Various modifications may be made in the precise details and arrangements. For example, an electrostatic equivalent may be employed for the arrangement shown in Figure 6, and in place of the arrangement shown in Figure 7 a microphone and associated amplifiers may be employed and operated by means of a jewel resting upon the wax cylinder. Signals may be recorded at supersonic frequencies in the manner described above, but the invention is not limited to the employment of such frequencies; for example, direct currents may be caused to vary the depth of the original record and in the reproducing apparatus these may be made to operate a photo-electric cell by means of a mirror and source of light, and reproduce the lines of varying depth according to the desired code.

The speed of rotation of the recording cylinder and the reproducing cylinder should be maintained constant, and it is preferable to employ the same means to control both instruments. The speed of rotation of the reproducer will be a fraction of that of the recorder; for example, if the recording cylinder is rotating at 500 revolutions per minute, at 1000 words per minute, then, if the reading-up speed is 100 words per minute, the reproducing cylinder will rotate at 50 revolutions per minute.

By means of apparatus as described above, it has been found possible efficiently to record frequencies lying within the radio frequency band, say 20,000 cycles. With previous constructions the upper limit was believed to be in the neighborhood of 3,000 cycles. Therefore, if telephone modulation is to be employed, the transmitter will be modulated with the characters at this frequency. In continuous wave transmission, the beat frequency would be made in the region of 20,000 cycles, for example.

As a result, it is possible to use a phonograph to record and reproduce signals originally sent at, say, 1000 words per minute, for if the recording frequency is 20,000 cycles, then if we reproduce at 50 words per minute the reading frequency will still be 660 cycles per second, which is quite a satisfactory reading off frequency.

By this system of our invention we are enabled to increase substantially the speed of transmission of code signals and thereby transmit a much larger number of messages over a given signal channel in a given period of time. We are further enabled to record the signal vibration directly in the form of pulses of the super-audible radio frequency.

While we have shown but a single embodiment of our invention in the foregoing drawings and descriptions, it is capable of various modifications therefrom without departing from the spirit thereof, and it is desired therefore that only such limitations shall be imposed thereon as are required by the prior art or indicated by the appended claims.

We claim as our invention:

1. The method of transmitting signals at high speed which consists in perforating a tape in accordance with the desired signals, causing said tape to interrupt a beam of light, incident upon a light sensitive cell, in accordance with said signals, and causing alternating current pulses from said cell to control a signal transmitter.

2. The method of transmitting code signals at high speed which consists in perforating a tape in accordance with said signals, varying the illumination of a light sensitive cell in accordance therewith, energizing a radio frequency channel in accordance with current pulses therefrom, receiving the radio frequency, and recording the code signals at a radio frequency directly.

3. The method of transmitting signals at high speeds which consists in perforating a tape in accordance with the signals, controlling a light responsive means thereby modulating a radio frequency signal channel in accordance with current pulses therefrom, receiving said radio frequency vibrations, and mechanically tracing super audible vibrations resulting from the reception of the radio frequency vibrations directly upon a record.

4. The method of transmitting signals at high speeds which consists in perforating a tape in accordance with the signals, controlling a light responsive means thereby, modulating a radio frequency signal channel in accordance with current pulses therefrom, receiving the radio frequency vibrations, recording the vibrations directly upon a plastic record at high speed, and transcribing therefrom at a slower speed whereby said vibrations become audible.

5. The method of transmitting signals at high speed which consists in producing signals at such speed that the code frequency itself lies without the usual auditory vibration frequency range, modulating radio frequency energy in accordance therewith, transmitting said modulated radio frequency energy, recording energy derived from said radio frequency energy permanently at a high speed, and transcribing at will subsequently said permanent recordings at a lower speed.

6. The method of transmitting signals which comprises producing code signals at such frequency that the code frequency itself lies without the audible range, modulating a radio frequency thereby, transmitting the radio frequency, receiving the radio frequency, heterodyning to change the radio frequency to a super audible frequency, recording the super audible frequency directly and permanently upon a high speed record, and transcribing said record at a lower speed.

7. The method of transmitting signals at high speed which consists in transcribing a signal code upon a tape, controlling a light beam in accordance therewith, exciting a photo-electric cell by the controlled light beam, and energizing said cell with alternating current fluctuating at a super-audible frequency.

8. The method of transmitting signals at high speed which consists in transcribing a signal code upon a tape, controlling a light beam in accordance therewith, exciting a photo-electric cell by the controlled light beam, energizing said cell with current fluctuating at a super-audible frequency, modulating a radio frequency channel in accordance with code modulated current pulses therefrom, transmitting said radio frequency currents, receiving said currents and recording said code modulated super-audible frequency currents directly.

9. The method of transmitting signals at high speed which consists in transcribing a signal code upon a tape, controlling a light beam in accordance therewith, exciting a photo-electric cell by the controlled light beam, energizing said cell with current fluctuating at a super-audible frequency, modulating radio frequency energy in accordance with code modulated current pulses from said cell, transmitting said radio frequency energy, receiving said radio frequency energy, recording code modulated super-audible frequency currents resulting from the reception of said radio frequency energy directly, at high speed, and transcribing said record at a lower speed.

10. In radio frequency carrier wave signalling systems the combination of means for mechanically recording super audible frequency waves, means for reproducing said recorded waves at a slower speed whereby the frequency of said super audible frequency waves is stepped down and indicating means for reproducing the stepped down frequency.

11. The method of signalling which consists in transmitting a carrier wave modulated at a super audible frequency, receiving said modulated carrier wave, recording mechanically the super audible component of said received wave at a super audible frequency and translating said recorded component at a lower frequency.

12. The method of signalling which consists in transmitting a super audible frequency carrier wave of constant amplitude, receiving said carrier wave, recording said received wave at a super audible frequency and reproducing said recorded super audible frequency wave at a lower frequency.

13. The method of signalling which includes transmitting a superaudible frequency carrier wave modulated by a wave of constant amplitude, receiving said carrier wave, tracing mechanically the modulated component of said received wave at a superaudible frequency and translating said recordings at a lower frequency.

14. The method of transmitting signals at high speeds which includes perforating a tape in accordance with a signal; controlling light responsive means thereby; modulating radio frequency energy in accordance with current pulses from said light responsive means; collecting a portion of the modulated radio frequency energy; mechanically tracing a component of the collected radio frequency energy upon a record at a high speed; and translating said record at a lower speed.

15. The method of transmitting signals at high speeds which includes transcribing a signal upon a record; controlling a beam of radiant energy in accordance with the transcribed signal; exposing an element, sensitive to radiant energy, to said beam; energizing said element with current fluctuating at a superaudible frequency; modulating energy of a still higher frequency in accordance with signal modulated current from said element; transmitting said higher frequency energy to a receiving station; collecting at the receiving station a portion of said higher frequency energy; and recording the signal derived from said collected energy.

16. An element sensitive to radiant energy; a source of radiant energy; a record, having the message portions thereof more conductive to radiant energy than the other portions, interposed between said source and said element; means for moving the record relative to said element; and a source of alternating current in series with said element.

17. The method of signalling which includes modulating carrier energy at frequencies unintelligible to the ear in accordance with a desired signal; transmitting the carrier energy to a receiving station; rectifying the received carrier energy; mechanically tracing upon a record at frequencies unintelligible to the ear the rectified received carrier energy; and subsequently translating the record due to the mechanical tracing.

18. The method of signalling which includes modulating carrier energy at frequencies unintelligible to the ear in accordance with a desired signal; transmitting the carrier energy to a receiving station; rectifying the received carrier energy; tracing in a manner other than electrical upon a record at frequencies unintelligible to the ear the rectified received carrier energy; and subsequently translating the record due to the tracing.

19. The method of signalling which includes modulating carrier energy at frequencies unintelligible to the ear in accordance with a signal to be transmitted; transmitting the carrier energy to a receiving station; collecting a portion of the transmitted carrier energy at the receiving station; utilizing the collected energy for tracing at frequencies unintelligible to the ear in a manner other than magnetic, a record; and subsequently translating the traced record.

20. The method of transmitting signals at high speed which comprises producing signals at such a speed that the code frequency itself lies within the auditory frequency range, modulating radio frequency energy at a higher frequency in accordance therewith, transmitting said modulated radio frequency, recording energy derived from said radio frequency energy permanently at a high speed corresponding to said higher frequency, and transcribing at will subsequently said permanent recordings at a lower speed.

GEORGE MAURICE WRIGHT.
SIDNEY BERTRAM SMITH.